(12) United States Patent
Okuno

(10) Patent No.: US 7,299,262 B2
(45) Date of Patent: Nov. 20, 2007

(54) INFORMATION PROVIDING SUPPORT SYSTEM AND METHOD, AND PROGRAM AND SERVER FOR USE IN THE SYSTEM AND METHOD

(75) Inventor: Yoshitada Okuno, Tokyo (JP)

(73) Assignee: Gakken Co., Ltd., Tokyo (JP)

( * ) Notice: Subject to any disclaimer, the term of this patent is extended or adjusted under 35 U.S.C. 154(b) by 874 days.

(21) Appl. No.: 10/663,891

(22) Filed: Sep. 16, 2003

(65) Prior Publication Data

US 2004/0073618 A1 Apr. 15, 2004

Related U.S. Application Data

(63) Continuation of application No. PCT/JP02/03394, filed on Apr. 4, 2002.

(30) Foreign Application Priority Data

Apr. 9, 2001 (JP) ............................. 2001-110400

(51) Int. Cl.
*G06F 15/16* (2006.01)
(52) U.S. Cl. ..................... 709/206; 709/203; 709/219
(58) Field of Classification Search ................... None
See application file for complete search history.

(56) References Cited

U.S. PATENT DOCUMENTS

| | | | | |
|---|---|---|---|---|
| 5,793,972 | A | * | 8/1998 | Shane ......................... 709/219 |
| 6,047,310 | A | * | 4/2000 | Kamakura et al. .......... 709/201 |
| 6,108,779 | A | * | 8/2000 | Dean et al. .................... 713/2 |
| 6,301,621 | B1 | * | 10/2001 | Haverstock et al. ........ 709/246 |
| 6,363,412 | B1 | * | 3/2002 | Niwa et al. ................. 709/203 |
| 6,377,978 | B1 | * | 4/2002 | Nguyen ...................... 709/206 |
| 2002/0019850 | A1 | * | 2/2002 | Nakamura .................. 709/206 |
| 2002/0023135 | A1 | * | 2/2002 | Shuster ....................... 709/206 |
| 2002/0038337 | A1 | * | 3/2002 | Satomi et al. .............. 709/203 |
| 2002/0103883 | A1 | * | 8/2002 | Haverstock et al. ........ 709/219 |
| 2002/0169835 | A1 | * | 11/2002 | Paul et al. .................. 709/206 |

FOREIGN PATENT DOCUMENTS

| | | |
|---|---|---|
| EP | 1 045 322 A | 10/2000 |
| JP | 9-50441 | 2/1997 |
| JP | 9-91358 | 4/1997 |
| JP | 09-097287 | 4/1997 |

(Continued)

OTHER PUBLICATIONS

Japanese Patent Office, International Search Report PCT/JP02/03394, Jul. 2, 2002.

(Continued)

*Primary Examiner*—John B. Walsh
(74) *Attorney, Agent, or Firm*—Michael Best & Friedrich

(57) ABSTRACT

There is disclosed a system of the present invention, in which in a server, an s-memo code is attached to and associated with predetermined information, and stored, when the predetermined information is transmitted from a client terminal apparatus, and the code is extracted, and predetermined information corresponding to the code is returned to user terminal apparatuses as desired by users via an electronic mail, when the user terminal apparatuses transmit electronic mails including the s-memo code described in "title".

13 Claims, 10 Drawing Sheets

FOREIGN PATENT DOCUMENTS

| | | |
|---|---|---|
| JP | 10-307772 | 11/1998 |
| JP | 10-307826 | 11/1998 |
| JP | 10-336233 | 12/1998 |
| JP | 11-272582 | 10/1999 |
| JP | 2000-57066 | 2/2000 |
| JP | 2000-270008 | 9/2000 |
| JP | 2000-357174 | 12/2000 |
| JP | 2002-24149 | 1/2002 |
| JP | 2002-41396 | 2/2002 |
| JP | 2003-102071 | 4/2003 |
| JP | 2003-115879 | 4/2003 |

OTHER PUBLICATIONS

Japanese Patent Office, International Preliminary Examination Report, PCT/JP02/03394, May 20, 2003 (Japanese Only).

Supplementary European Search Report, European Patent Application No. 02717070.3, dated Nov. 4, 2005.

Japanese Patent Office, International Examination Report PCT/JP02/03394, May 20, 2003 (English Translation).

* cited by examiner

| Client | S-memo code | Text | Category | Format | ... |
|---|---|---|---|---|---|
| bbbbb | 10125 | New method for measuring business conditions was published, and whole world was surprised | Economy | TEXT | |
| aaaaa | 10126 | HP of par golf is http://www.XXXX | Leisure | TEXT | |
| ccccc | 10127 | Music HP is http://www.XXXX | Music | TEXT | |
| aaaaa | 10128 | New first-grade student reference book○○ Phone No.×××  | Education | TEXT | |
| ... | ... | ... | ... | ... | ... |
| | | | | | |
| | | | | | |

F I G. 10

ID [ ddddd ]
PW [ ***** ]

F I G. 11 ddddd's reception condition setting page

Address 1 (basic address)
[ d1@×××.ne.jp ]
■TEXT　□HTML
Attached file　● Disapproved　○ Approved
Number of characters MAX　[ 250 ] characters
Attached file size MAX　[    ] kbyte
DM　○ Accepted　● Rejected Address 2 (another addresses)
[ d2@×××.co.jp ]
■TEXT　■HTML
Attached file　○ Disapproved　● Approved
Number of characters MAX　[    ] characters
Attached file size MAX　[ 1000 ] kbyte
DM　● Accepted　○ Rejected Address 3 (another addresses)
[ d3@×××.ne.jp ]
□TEXT　□HTML
Attached file　● Disapproved　○ Approved
Number of characters MAX　[    ] characters
Attached file size MAX　[    ] kbyte
DM　● Accepted　○ Rejected

[ OK ]

24

| User ID | Address 1 | TEXT1 | HTML1 | Attached 1 | Character 1 | DATA | DM1 |
|---|---|---|---|---|---|---|---|
| ddddd | d1@xxx.ne.jp | YES | NO | NO | 250 | 250 | NO |
| eeeee | e1@xxx.ne.jp | YES | NO | NO | 250 | 250 | NO |
| ... | ... | | | | | | |

| Address 2 | TEXT2 | HTML2 | Attached 2 | Character 2 | DATA2 | DM2 |
|---|---|---|---|---|---|---|
| d2@xxx.ne.jp | YES | YES | YES | | 1000 | YES |
| e2@xxx.ne.jp | YES | YES | NO | | | NO |
| ... | | | | | | |

| Address 3 | TEXT3 | HTML3 | Attached 3 | Character 3 | DATA3 | DM3 | ... |
|---|---|---|---|---|---|---|---|
| d3@xxx.ne.jp | NO | NO | NO | | | YES | ... |
| ... | NO | NO | NO | | | YES | ... |

F I G. 12

INFORMATION PROVIDING SUPPORT SYSTEM AND METHOD, AND PROGRAM AND SERVER FOR USE IN THE SYSTEM AND METHOD

CROSS-REFERENCE TO RELATED APPLICATIONS

This is a Continuation Application of PCT Application No. PCT/JP02/03394, filed Apr. 4, 2002, which was not published under PCT Article 21 (2) in English.

This application is based upon and claims the benefit of priority from the prior Japanese Patent Application No. 2001-110400, filed Apr. 9, 2001, the entire contents of which are incorporated herein by reference.

BACKGROUND OF THE INVENTION

1. Field of the Invention

The present invention relates to a system using a network, particularly to an information providing support system and method in which a client can easily provide information and a user can easily enjoy the information via electronic mail, and to a program and server for use in the system and method.

2. Description of the Related Art

Advertising activities and various information services by various companies have heretofore been carried out, for example, by advertising posters hung in trains, advertisements on wrapping buses, business cards, advertisements in newspapers and magazines, and articles.

Therefore, when the user records or stores desired information described in these advertisements, it has been necessary to manually take notes or to use special apparatuses such as a copy machine, scanner, and digital camera.

Therefore, for example, even when the user sees interesting advertisements by chance outdoors, and unless the user carries memo pads or various apparatuses described above, it has been impossible to instantly record/store/edit the information described in the advertisements.

Moreover, in recent years, uniform resource locators (URL) of own web pages of the companies have been placed in various advertisements as described above in many cases.

In this case, the user uses a personal computer to access the web page of the company in which the user takes an interest via the Internet, and can accordingly obtain desired information placed in the advertisements or associated information.

However, from a standpoint of the client company, in order to open the own web page on the Internet, hypertext by hypertext markup language (HTML) and required images need to be stored on web servers such as an internet presence provider (IPP) by a file transfer protocol (FTP) tool, processing is complicated, there have also been many cases requiring contracts with the IPP beforehand, and this has been intricate.

Moreover, from a user's standpoint, on accessing the web page of the company in which the user takes an interest, only an HTML source is obtained. In a user's terminal, the received HTML source is analyzed with a browser and only displayed in a predetermined manner. Therefore, it has not been easy to store/edit/arrange obtained information.

On the other hand, in recent years, a cellular phone or a portable information terminal has generally been used to access the web page of the Internet in a place where the user has gone and to obtain the information. However, there have been restrictions on the information (web page) obtained in this case, and it has not been easy to store, edit, or arrange the obtained information as described above. Furthermore, since the capacity of the built-in memory is limited in the cellular phone, there has also been a limit to the amount of information capable of being stored. On the other hand, in order to provide the information to the user which is an object, it is also necessary for the client company to prepare the web page for exclusive use in the cellular phone, a burden is also large, and this has been intricate.

Here, taking notice of user's operability, a technique has also heretofore been developed for automatically converting a predetermined code into a URL, when the code is input instead of the URL in accessing the web page. However, in this technique, the user needs to install predetermined software in the own personal computer for use or to access a unique web page before accessing the desired web page, and eventually intricate operations have been involved.

As described above, the user hopes to obtain the desired information quickly with a simple operation in a form suitable for storing/editing/arranging the information, but there has not been any technique to realize this.

It is to be noted that, for example, in Jpn. Pat. Appln. KOKAI Publication No. 2000-57066, a technique is disclosed for automatically deciphering a received question content and extracting corresponding data from a database to automatically return the data via electronic mail, when questions and answers concerning provided information content by product catalogs are returned via electronic mail.

However, in the publication, it is described that when the question content is assumed beforehand, the corresponding data can be returned via the electronic mail, but there is not any "concrete description" concerning a method for deciphering the received question content. The technique is intricate, because it is necessary to send the question content in sentences.

The present invention has been developed in consideration of the above-described problems, and an object thereof is to provide the following convenience to a user and client, support an information providing service between the user and client, and simplify and smooth the service in an information providing support system and method in which a client terminal apparatus, user terminal apparatus, and server are connected to one another via a network for communication and in a program and server for use in the system and method.

That is, as a detailed object, a user only performs a simple operation with a user terminal apparatus (apparatus having a function of being capable of transmitting/receiving electronic mails) so that desired information on advertisements can quickly be obtained via the electronic mail in a form suitable for storing, editing, or arranging the information. A further object is that reception conditions of the electronic mail can appropriately be set, and accordingly, for example, the information on the advertisements can be received in two or more desired addresses.

Moreover, an object is for a client to only perform a simple operation with a client terminal apparatus so that desired advertisement information and attached files can quickly be registered as an object capable of being supplied to a user at any time for 24 hours. As a further object, mail addresses of users who have predetermined tastes can be collected, and direct mails can automatically be transmitted to the user.

BRIEF SUMMARY OF THE INVENTION

According to a first aspect of the present invention, there is provided a server which can freely communicate with a client terminal apparatus and a user terminal apparatus via a network, comprising: a communication section which communicates with the client terminal apparatus and user terminal apparatus; a control section which executes control so as to attach a predetermined code including a character string to predetermined information in a stage in which the predetermined information is accepted, when the communication section receives the predetermined information transmitted from the client terminal apparatus; and a storage section which associates and stores at least the predetermined code with the predetermined information and further a user ID with an address and a reception condition concerning the address, wherein the control section executes the control so as to extract the predetermined code included in an electronic mail as information corresponding to a title of the electronic mail, read the predetermined information corresponding to the predetermined code from the storage section, and return the predetermined information to the address from the communication section via the electronic mail, when the communication section receives the electronic mail transmitted from the user terminal apparatus.

According to a second aspect of the present invention, there is provided a server which can freely communicate with a client terminal apparatus and a user terminal apparatus via a network, comprising: a communication section which communicates with the client terminal apparatus and user terminal apparatus; a control section which executes control so as to attach a predetermined code including a character string to predetermined information in a stage in which the predetermined information is accepted, when the communication section receives the predetermined information transmitted from the client terminal apparatus; and a storage section which associates and stores at least the predetermined code with the predetermined information and further a user ID with a plurality of addresses and reception conditions concerning the respective addresses, wherein the reception conditions include setting information on a file format for each of the plurality of addresses, disapproval/approval of an attached file, a maximum value of the number of characters, a maximum value of an attached file size, and acceptance/rejection of a direct mail, and the control section executes the control so as to extract the predetermined code included in an electronic mail as information corresponding to a title of the electronic mail, read the predetermined information corresponding to the predetermined code from the storage section, and return the predetermined information to the address from the communication section via the electronic mail, when the communication section receives the electronic mail transmitted from the user terminal apparatus.

According to a third aspect of the present invention, there is provided a server which can freely communicate with a client terminal apparatus and a user terminal apparatus via a network, comprising: a communication section which communicates with the client terminal apparatus and user terminal apparatus; a control section which executes control so as to attach a predetermined code including a character string to predetermined information in a stage in which the predetermined information is accepted, when the communication section receives the predetermined information transmitted from the client terminal apparatus; and a storage section which associates and stores at least the predetermined code with the predetermined information, further the predetermined code with the predetermined information and a category of the predetermined information, and further a user ID with a demander address and the predetermined code, wherein the control section executes the control so as to extract the predetermined code included in an electronic mail as information corresponding to a title of the electronic mail, read the predetermined information corresponding to the predetermined code from the storage section, and return the predetermined information to the user terminal apparatus from the communication section via the electronic mail, when the communication section receives the electronic mail transmitted from the user terminal apparatus, and so as to acquire the predetermined code corresponding to the category from the storage section, further acquire the user ID and demander address corresponding to the predetermined code from the storage section, and transmit a direct mail to the demander address.

According to a fourth aspect of the present invention, there is provided a server which can freely communicate with a client terminal apparatus and a user terminal apparatus via a network, comprising: a communication section which communicates with the client terminal apparatus and user terminal apparatus; a control section which executes control so as to attach a predetermined code including a character string to predetermined information in a stage in which the predetermined information is accepted, when the communication section receives the predetermined information transmitted from the client terminal apparatus; and a storage section which associates and stores the predetermined code with a plurality of pieces of the predetermined information, wherein the control section executes the control so as to extract the predetermined code included in an electronic mail as information corresponding to a title of the electronic mail, read the predetermined information corresponding to the predetermined code from the storage section under a predetermined rule concerning random, date designation, and time designation, and return the predetermined information to the user terminal apparatus from the communication section via the electronic mail, when the communication section receives the electronic mail transmitted from the user terminal apparatus.

According to a fifth aspect of the present invention, there is provided an information providing support method by a server which can freely communicate with a client terminal apparatus and a user terminal apparatus via a network and which comprises a communication section, a control section, and a storage section, the method comprising: executing control by the control section so as to attach a predetermined code including a character string to predetermined information in a stage in which the predetermined information is accepted, when the communication section receives the predetermined information transmitted from the client terminal apparatus; associating and storing the predetermined code with the predetermined information and further a user ID with an address and reception conditions concerning the address by the storage section; extracting the predetermined code included in an electronic mail as information corresponding to a title of the electronic mail by the control section, when the communication section receives the electronic mail transmitted from the user terminal apparatus; and executing the control by the control section so as to read the predetermined information corresponding to the predetermined code from the storage section, and return the predetermined information to the address via the electronic mail by the communication section.

According to a sixth aspect of the present invention, there is provided an information providing support method by a server which can freely communicate with a client terminal apparatus and a user terminal apparatus via a network and which comprises a communication section, a control section, and a storage section, the method comprising: executing control by the control section so as to attach a predetermined code including a character string to predetermined information in a stage in which the predetermined information is accepted, when the communication section receives the predetermined information transmitted from the client terminal apparatus, and associating and storing the predetermined code with a plurality of pieces of the predetermined information by the storage section; and executing the control by the control section so as to extract the predetermined code included in an electronic mail as information corresponding to a title of the electronic mail, read the predetermined information corresponding to the predetermined code from the storage section under a predetermined rule concerning random, date designation, and time designation, and return the predetermined information to the user terminal apparatus from the communication section via the electronic mail, when the communication section receives the electronic mail transmitted from the user terminal apparatus.

According to a seventh aspect of the present invention, there is provided a program for use in a server which can freely communicate with a client terminal apparatus and a user terminal apparatus and which comprises a storage section, the program allowing the server to execute a process comprising: a step of attaching a predetermined code including a character string to predetermined information in a stage in which the predetermined information from the client terminal apparatus is accepted; a step of associating and storing the predetermined code with the predetermined information and further with a user ID, an address, and reception conditions concerning the address by the storage section; and a step of extracting the predetermined code included in an electronic mail as information corresponding to a title of the electronic mail from the user terminal apparatus, reading the predetermined information corresponding to the predetermined code from the storage section, and returning the predetermined information to the address via the electronic mail.

According to an eighth aspect of the present invention, there is provided a program for use in a server which can freely communicate with a client terminal apparatus and a user terminal apparatus and which comprises a storage section, the program allowing the server to execute a process comprising: a step of executing control so as to attach a predetermined code including a character string to predetermined information in a stage in which the predetermined information is accepted, when the predetermined information transmitted from the client terminal apparatus is received, and associating and storing the predetermined code with a plurality of pieces of the predetermined information in the storage section; and a step of executing the control so as to extract the predetermined code included in an electronic mail as information corresponding to a title of the electronic mail, read the predetermined information corresponding to the predetermined code from the storage section under a predetermined rule concerning random, date designation, and time designation, and return the predetermined information to the user terminal apparatus from the communication section via the electronic mail, when the electronic mail transmitted from the user terminal apparatus is received.

BRIEF DESCRIPTION OF THE SEVERAL VIEWS OF THE DRAWING

FIG. 5 is a diagram showing one example of a client authentication page;

FIG. 6 is a diagram showing one example of a text registration page;

FIG. 10 is a diagram showing one example of a user authentication page;

FIG. 11 is a diagram showing one example of a personal reception condition customized page;

FIG. 12 is a diagram showing one example of a user table;

DETAILED DESCRIPTION OF THE INVENTION

An embodiment of the present invention will be described hereinafter with reference to the drawings.

First, a constitution of an information providing support system according to one embodiment of the present invention will be described in detail with reference to FIGS. 1 to 3.

Figure 1:
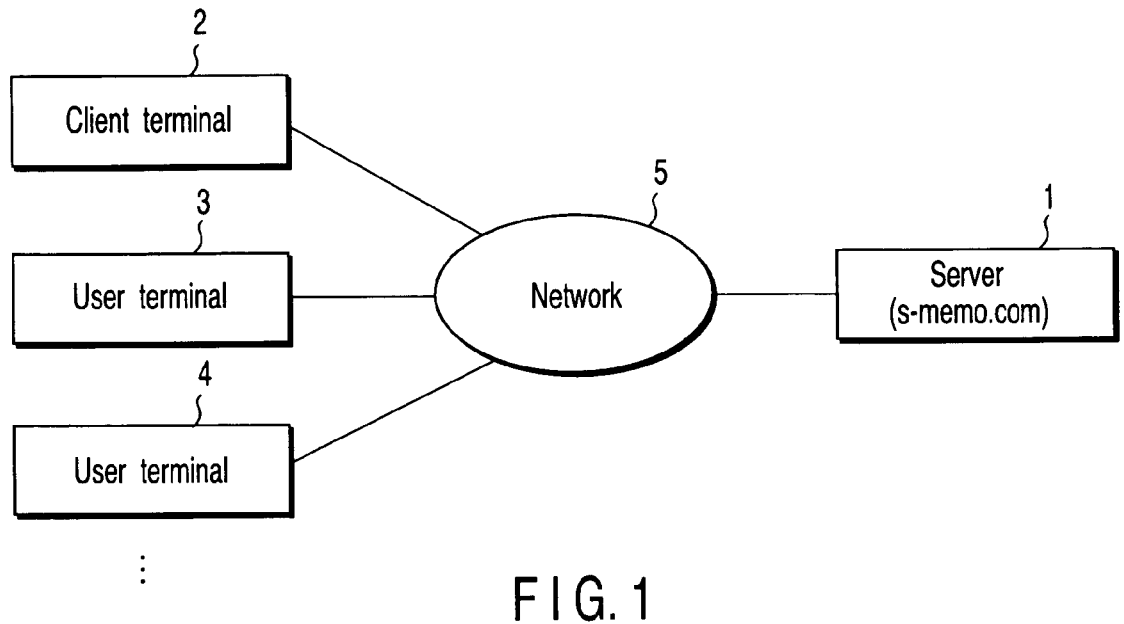
FIG. 1 is a schematic constitution diagram of an information providing support system according to one embodiment of the present invention.

As shown in FIG. 1, the information providing support system is constituted of a server 1 connected to a client terminal apparatus 2 and user terminal apparatuses 3, 4 via a network 5 so that communication is possible. The client terminal apparatus 2 such as a personal computer is assumed. In addition to the personal computer, the user terminal apparatuses 3, 4 such as a cellular phone and a personal digital assistant (PDA) are assumed.

Moreover, the network 5 such as internet is assumed, but is not limited to this, and, needless to say, LAN, WAN, and the like are included.

It is to be noted that in FIG. 1, to simplify the description, only one client terminal apparatus 2 and two user terminal apparatuses 3, 4 are shown, but, needless to say, a plurality of client terminal apparatuses and user terminal apparatuses are connected.

Figure 2:
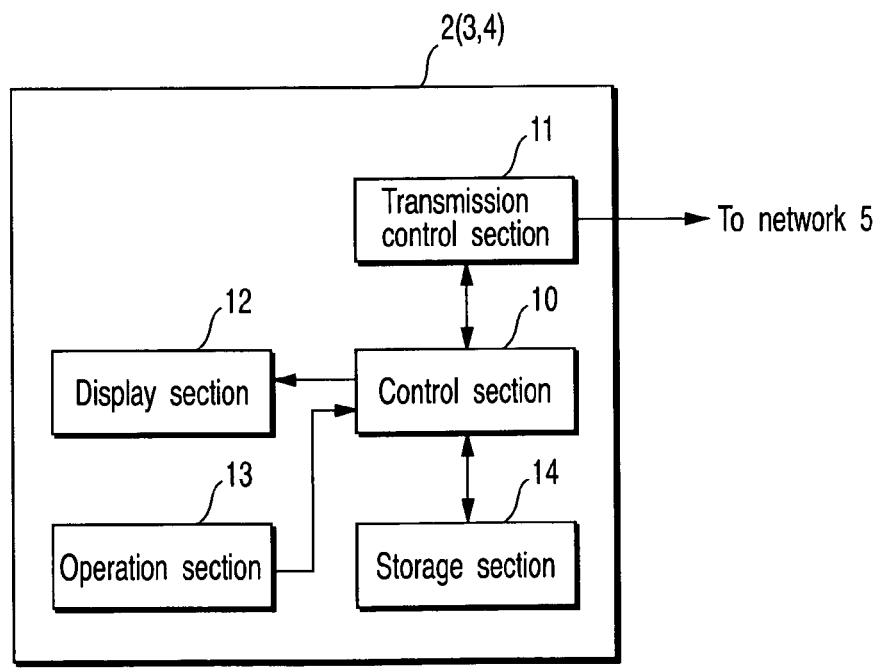
FIG. 2 is a block diagram showing a detailed constitution example of a client terminal apparatus 2, and user terminal apparatuses 3, 4 in FIG. 1.

The client terminal apparatus 2 and user terminal apparatuses 3, 4 include an inner constitution shown, for example, in FIG. 2. That is, a control section 10 for executing a whole control is connected to a transmission control section 11 such as a modem, a display section 12 such as a CRT display and liquid crystal display, an operation section 13 such as a mouse and keyboard, and a storage section 14 such as a memory. In the storage section, general browser software, mailer software, and the like are stored.

Figure 3:
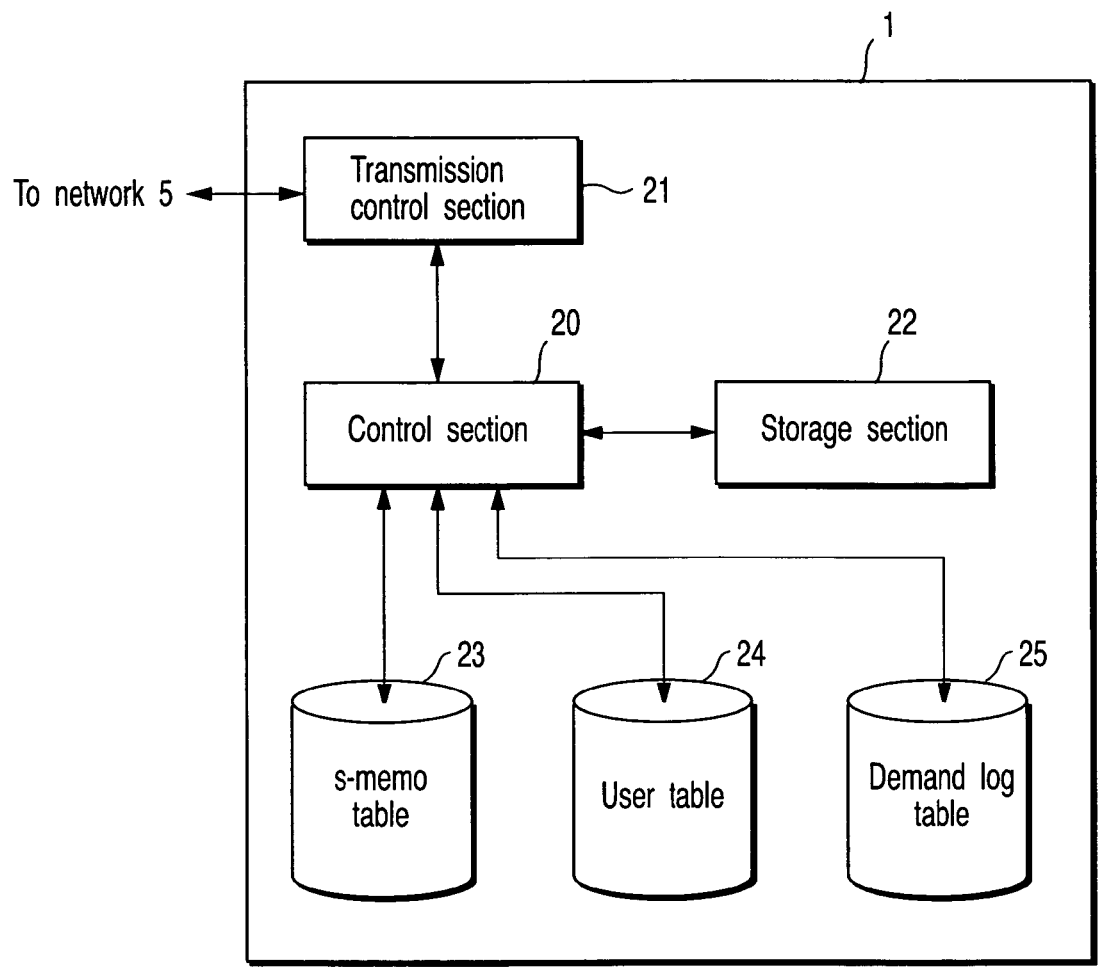
FIG. 3 is a block diagram showing a detailed constitution example of a server 1 in FIG. 1.
Figure 4:
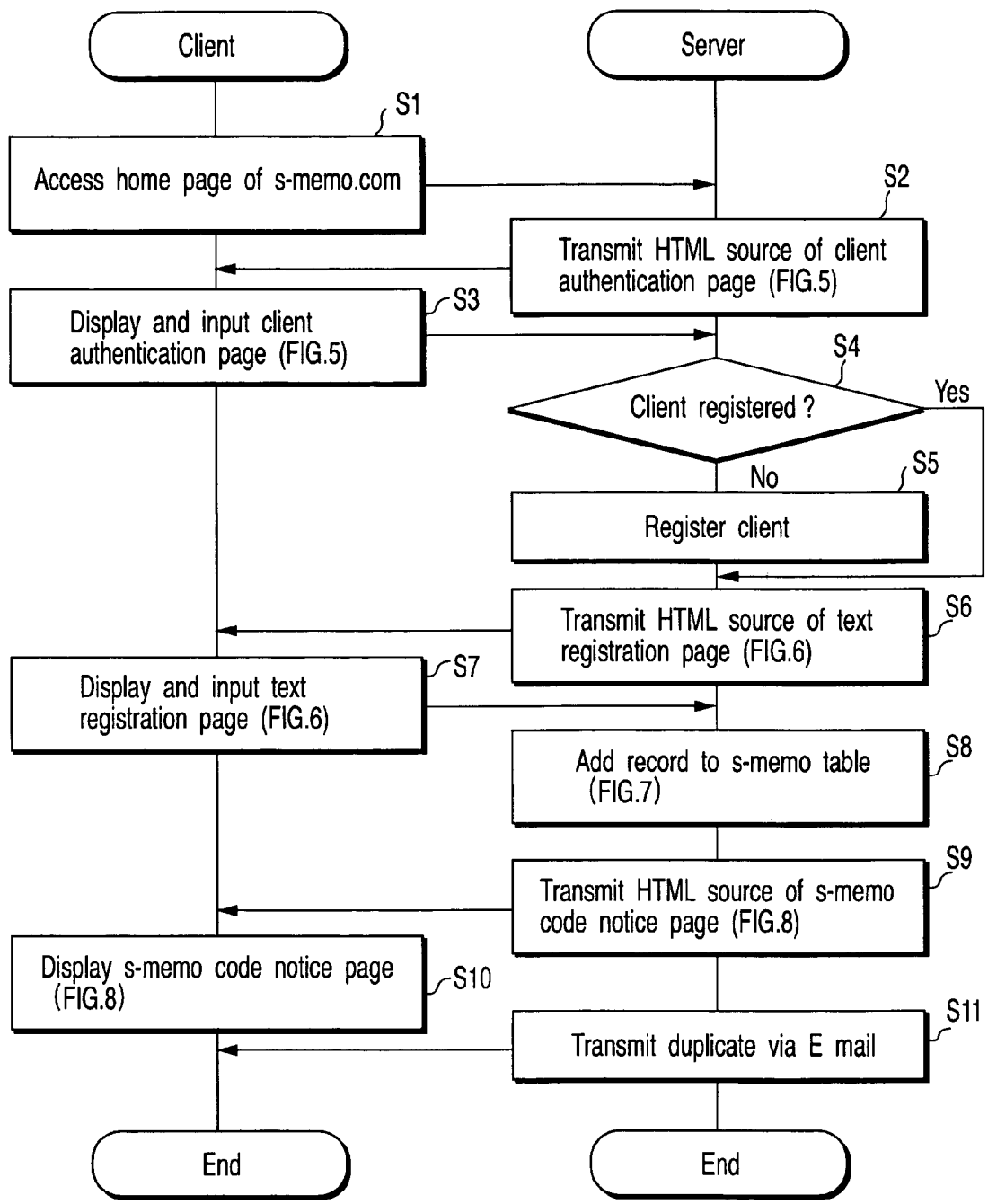
FIG. 4 is a flowchart showing a flow of a process for issuing s-memo code numbers.

On the other hand, the server 1 includes an inner constitution shown, for example, in FIG. 3. That is, a control section 20 for executing the whole control is connected to/constituted of a transmission control section 21 such as a modem and router, a storage section 22 such as the memory, and a database including an s-memo table 23, a user table 24, and a demand log table 25.

Here, an s-memo code is an identification code automatically given to the information at a time when the client supplies the information such as the advertisement to the server.

Figures 7, 8:
FIG. 7 is a diagram showing one example of an s-memo table.
FIG. 8 is a diagram showing one example of an s-memo code notice page.
Figure 9:
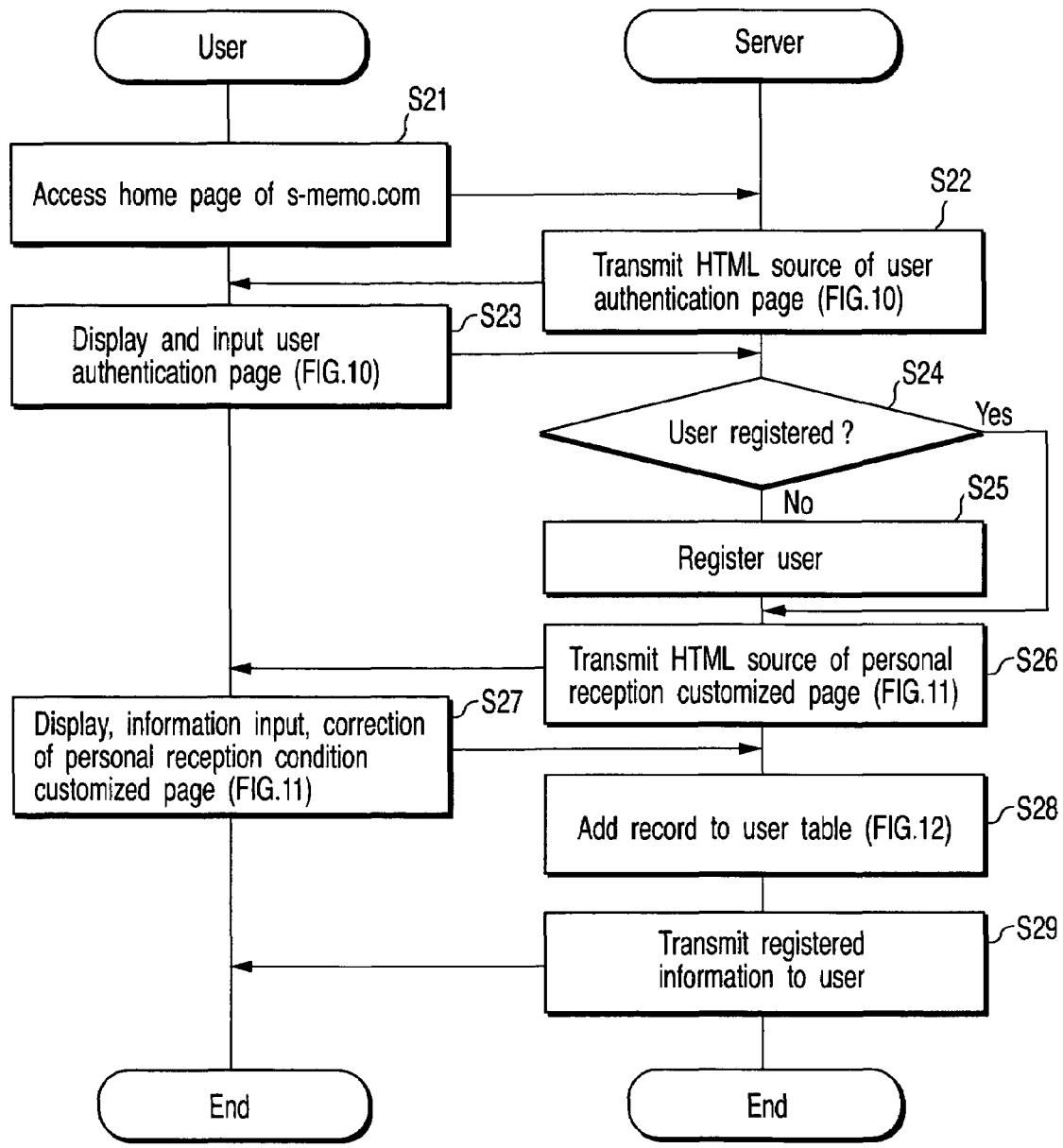
FIG. 9 is a flowchart showing the flow of a process concerning personal reception condition customization.
Figure 13:
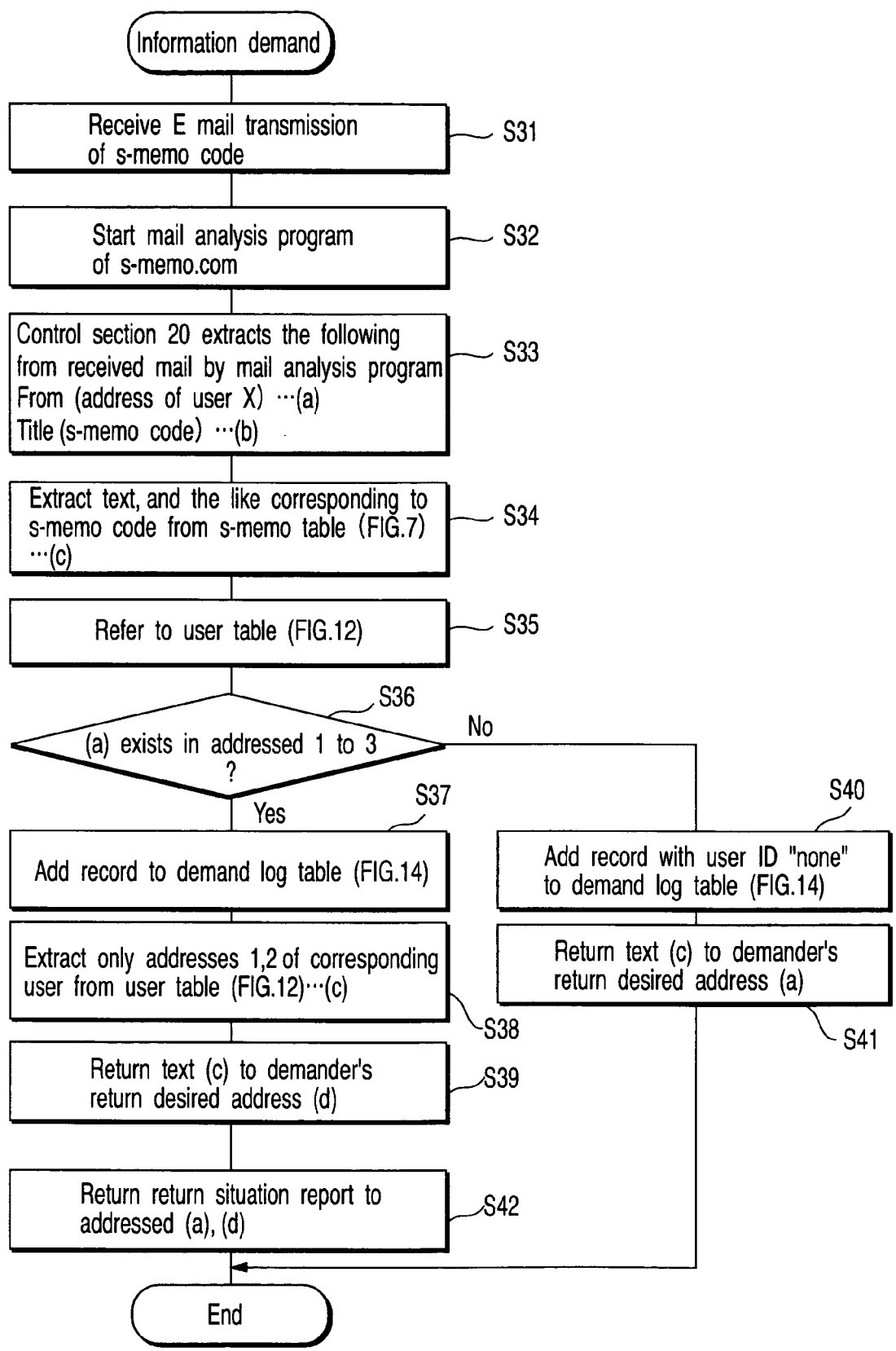
FIG. 13 is a flowchart showing the flow of the process of one example by a server which has received an electronic mail concerning a demand for information by a user.
Figures 14, 15:
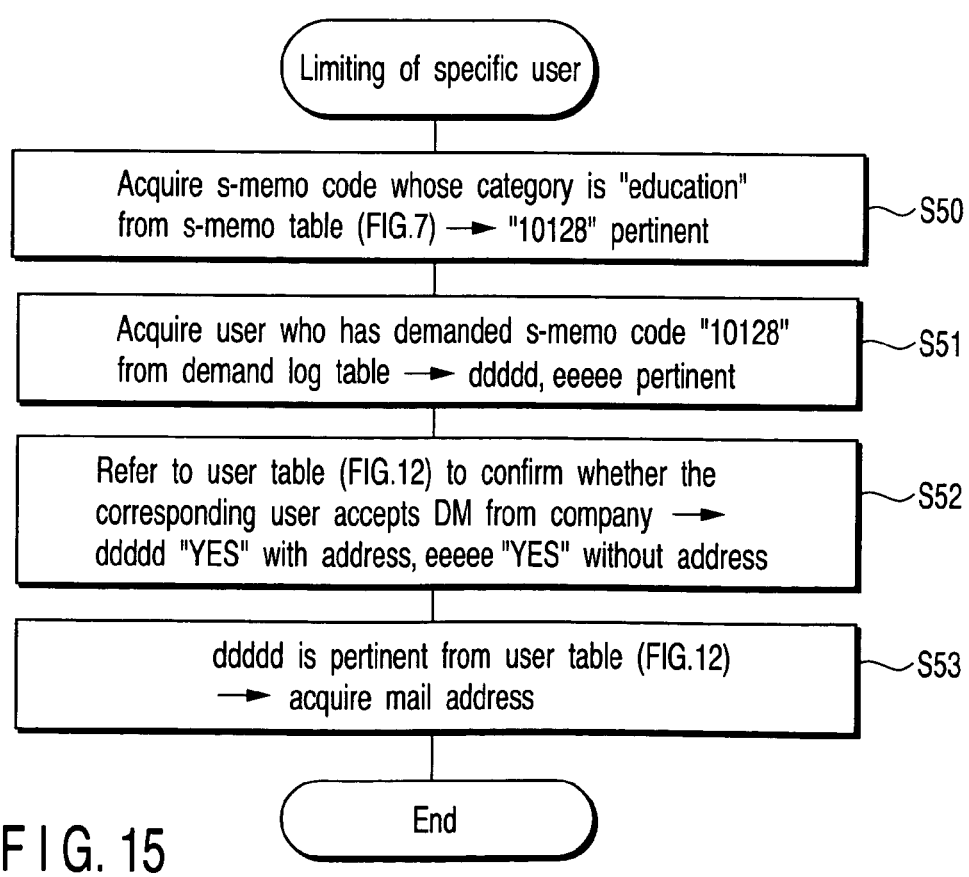
FIG. 14 is a diagram showing one example of a demand log table.
FIG. 15 is a flowchart showing the flow of a process for limiting a user who has specific tastes from recording of a demand action.

Moreover, the s-memo table 23 refers to a predetermined table for searching and extracting the information corresponding to the s-memo code. The constitutions of the s-memo table 23, user table 24, and demand log table 25 are shown in FIGS. 7, 12, 14, and the details will be described later.

It is to be noted that a client communication section and user communication section described in claims correspond, for example, to the transmission control section 11, and the server communication section corresponds, for example, to the transmission control section 21. A control section described in the claims corresponds, for example, to the control section 20, and a storage section corresponds, for example, to the database. Predetermined information refers to information provided by the client to receive an information providing support service, that is, information acquired by the user by the service, and a predetermined code refers to the s-memo code.

A function of the information providing support system constituted in this manner will be described hereinafter.

It is to be noted that here those who supply the information so as to receive the information providing support service are referred to as the "clients", and those who use the information are referred to as the "users".

First, a procedure for issuing an s-memo code number with respect to the information supplied from the client by the server 1 will be described in detail with reference to FIGS. 4 to 8.

When the client accesses the web page of "s-memo.com (this is a tentative domain name attached for the convenience of the description)" by the client terminal apparatus 2 (step S1), the server 1 transmits an HTML source of a client authentication page to the transmission control section 11 of the client terminal apparatus 2 via the transmission control section 21 and network 5 (step S2).

In the client terminal apparatus 2, the HTML source received by the transmission control section 11 is analyzed by the control section 10 to display the client authentication page in the display section 12 (step S3). This client authentication page is as shown in FIG. 5, and suggests input of client's ID and password (PW).

Here, when the client operates the operation section 13 to input the self ID and PW, the information is sent to the transmission control section 21 of the server 1 via the transmission control section 11 and network 5. Then, in the server 1, the control section 20 judges whether or not the client is registered (step S4). When the client is unregistered, predetermined client registration is carried out (step S5).

Next, the server 1 transmits the HTML source of a text registration page to the transmission control section 11 of the client terminal apparatus 2 via the transmission control section 21 and network 5 (step S6). Then, in the client terminal apparatus 2, the HTML source received by the transmission control section 11 is analyzed by the control section 10 to display the text registration page in the display section 12 (step S7).

Figures 5, 6:
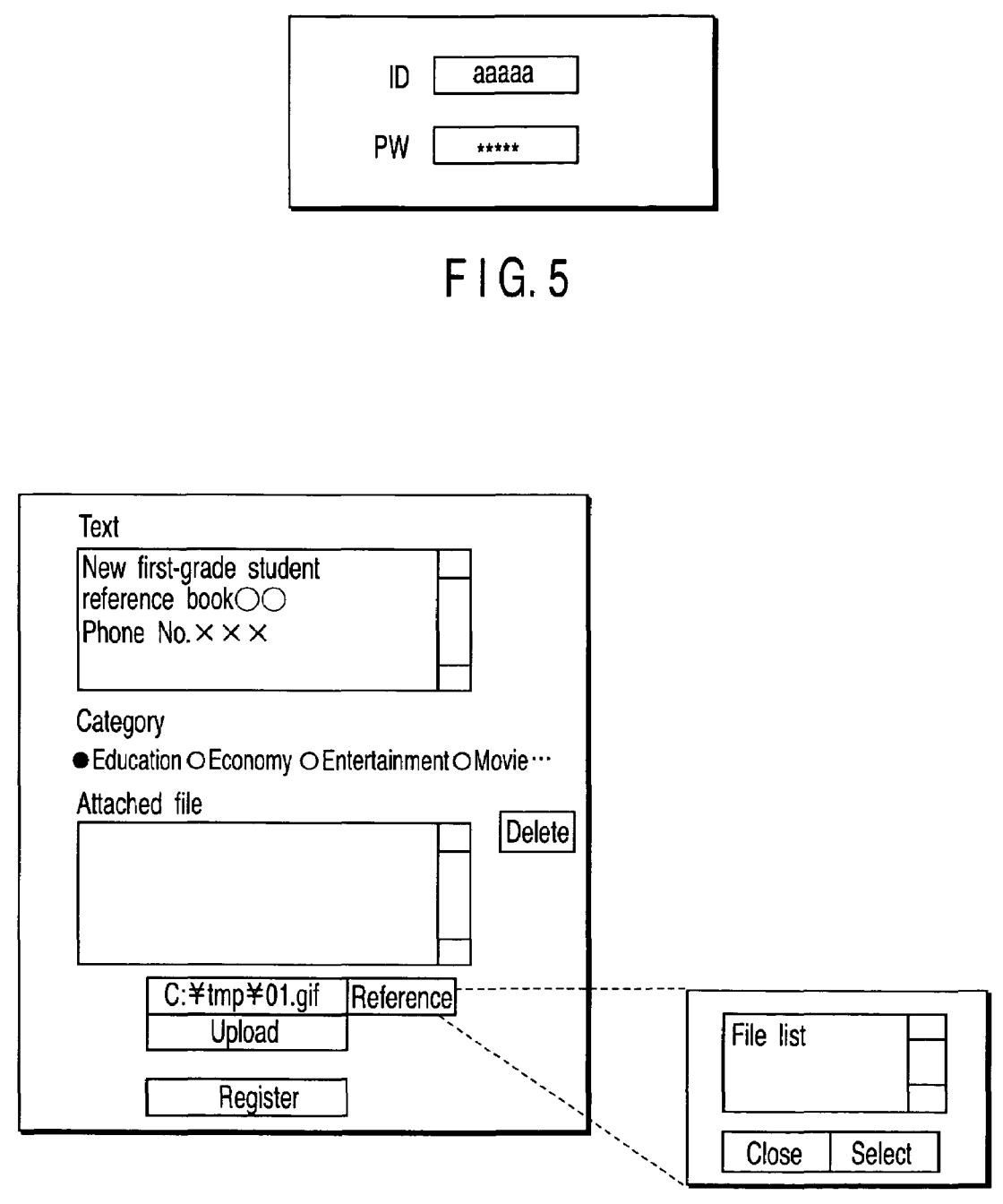

The text registration page is as shown in FIG. 6. In the client terminal apparatus 2, the following information is inputted into the display.

That is, the client writes a desired document such as the advertisement in a "text" region of the text registration page. In this case, a category of a content of the advertisement is selected from choices of a "category" region. In this example, "education" is selected.

When an attached file (image, music, program, and the like) is desired to be added, a "reference" button is clicked. Then, a dialog box of "file list" opens. Subsequently, a file desired to be attached is selected from a file group of a "file list" region, and a "select" button is clicked. Then, a selected file name ("C:\tmp\01.gif" in this example) is displayed on the left of a screen of the "reference" button. When an "upload" button is clicked in this state, the file is uploaded, and displayed in an "attached file" region. When the attached file is to be deleted, the file desired to be deleted is selected from the file group displayed in the "attached file" region, and a "delete" button may be clicked.

The above-described input information is sent to a server 1 side, and on the server 1 side, the control section 20 adds these records to the s-memo table 23 (step S8).

The s-memo table 23 includes a constitution as shown in FIG. 7.

That is, in this example, the client's ID is associated with the s-memo code, content of the text, category, format of the file, and the like, and stored.

For example, the information inputted by the client in the step S7 is stored as client ID "aaaaa", s-memo code "10128", text "new first-grade reference book ○○ phone No. XXX", category "education", and file format "TEXT" in a fourth row from above in the table 23.

Here, the s-memo code is automatically attached in a stage where the control section 20 of the server 1 accepts the text registration from the client terminal apparatus 2. This respect is one of characteristics of the present information providing support system.

Subsequently, the server 1 transmits the HTML source of the s-memo code notice page to the transmission control section 11 of the client terminal apparatus 2 via the transmission control section 21 and network 5 (step S9). Then, in the client terminal apparatus 2, the control section 10 analyzes the HTML source received by the transmission control section 11 to display the s-memo code notice page in the display section 12 (step S10).

This s-memo code notice page is as shown in FIG. 8.

That is, in the s-memo code notice page, the "text", "category", "attached file list", "file format" registered in the s-memo table 23, and the automatically attached "s-memo code" are displayed.

Therefore, the client can see this page to confirm that the desired information such as the advertisement is exactly registered on the server 1 side and that a state capable of receiving the information providing support service is obtained. That is, thereafter, the s-memo code is printed/included in the self advertisements, and can accordingly be used by the user.

It is to be noted that the content of the s-memo code notice page is transmitted to a client terminal apparatus 2 side from the server 1 even via the electronic mail (step S11). This facilitates the storing/arranging of the information on the client side.

As described above, a series of processes for automatically issuing the s-memo code number with respect to the information provided by the client end.

It is to be noted that in the above-described example, a sequence of numbers of five digits has been used as the s-memo code, but needless to say the present invention is not limited to this. For example, when the registered text has a TEXT format, XXXXX (X=0, 1, 2 . . . ) can be used. With an HTML format, h-XXXXX can be used. When the registered text includes the attached file, a-XXXXX can also be used.

In this case, when seeing an initial letter of the s-memo code, the user demanding the information can know the format of the file to be obtained in advance. It is to be noted that even in this case, although details are described later, needless to say, the initial letter can be omitted in demanding the information.

Next, a series of processes concerning personal reception condition customization by the user will be described in detail with reference to FIGS. 9 to 12. It is to be noted that in the present embodiment, the information can be acquired without any user registration. Therefore, the process of the personal reception condition customization is an arbitrary procedure performed only by a user who desires to perform the process.

When the user accesses a homepage of "s-memo.com" by the user terminal apparatus 3 (step S21), the server 1 transmits the HTML source of a user authentication page to the transmission control section 11 of the user terminal apparatus 3 via the transmission control section 21 and network 5 (step S22). Then, in the user terminal apparatus 3, the control section 10 analyzes the HTML source received by the transmission control section 11 to display the user authentication page in the display section 12 (step S23).

This user authentication page is, for example, as shown in FIG. 10, and suggests at least the input of the user's ID and PW.

Here, when the user operates the operation section 13 to input the self identifier (ID) and password (PW), the information is sent to the transmission control section 21 of the server 1 via the transmission control section 11 and network 5. Then, in the server 1, the control section 20 judges whether or not the user has been registered (step S24). When the user is unregistered, predetermined user registration is carried out (step S25).

Next, the server 1 transmits the HTML source of a personal reception condition customized page to the transmission control section 11 of the user terminal apparatus 3 via the transmission control section 21 and network 5 (step S26). Then, in the user terminal apparatus 3, the HTML source received by the transmission control section 11 is analyzed by the control section 10 to display the personal reception condition customized page in the display section 12 (step S27).

The personal reception condition customized page is as shown in FIG. 11.

That is, in the personal reception condition customized page, as receivers, an address 1 (basic address), address 2 (another address), and address 3 (another address) can be registered. Furthermore, for each of the addresses 1, 2, 3, file formats (TEXT, HTML), disapproval/approval of the attached file, the maximum value of the number of characters (MAX), the maximum value of the attached file size (MAX), and acceptance/rejection of a direct mail (hereinafter abbreviated as DM) can be set.

For example, in FIG. 11, in ddddd's reception condition setting page, "d1@xxx.ne.jp" is set as the address 1, the file format is TEXT, the attached file is disapproved, MAX of the number of characters is 250 characters, and DM is set to be rejected. Furthermore, "d2@xxx.co.jp" is set as the address 2, the file format is TEXT, HTML, the attached file is approved, MAX of the attached file size is 1000 kilobytes, and DM is set to be accepted. Moreover, "d3@xxx.ne.jp" is set as the address 3, the attached file is disapproved, and DM is set to be accepted.

It is to be noted that in the setting of the address 1, the attached file size MAX is not set. This is because the attached file is set to be disapproved, and the setting is not necessary.

The above-described input information is sent to the server 1 side, and on the server 1 side, the control section 20 adds these records to the user table 24 (step S28).

The constitution of the user table 24 is as shown in FIG. 12.

That is, in the user table 24, the user IDs are associated with the addresses 1 to 3 and the reception conditions concerning the respective addresses (set information concerning the file format, disapproval/approval of the attached file, MAX of the number of characters, attached file size MAX, and acceptance/rejection of DM) and stored. The information set beforehand in the reception condition setting page of FIG. 11 is stored as a user ID "ddddd", the addresses 1, 2, 3, and the respective reception conditions in a first row of the user table 24.

In this manner, the server 1 transmits the information registered in the user table 24 to the transmission control section 11 of the client terminal apparatus 2 via the transmission control section 21 and network 5 (step S29). As described above, a series of processes concerning the personal reception condition customization by the user ends.

Next, one example of the process related to the information providing support by the server 1 which has received the electronic mail related to the information demand by the user will be described with reference to FIGS. 7, 12 to 14.

For example, the user has an interest in the information by a certain client via an advertising poster hung in a train, advertisement of a wrapping bus, business card, advertisement on the newspaper and magazine, and articles. In this case, the user transmits the electronic mail in which the s-memo code printed on the advertisement is described in a column of "title" to the server 1, and then enters this process.

In this respect, the user may only grasp (register) only the mail address of the server 1 to which the s-memo code is to be sent, and this is very convenient.

In the server 1, on receiving the electronic mail from the user terminal apparatus 3 by the transmission control section 21 (step S31), the control section 20 starts a mail analysis program stored beforehand in the storage section 22 (step S32), and extracts the following items from the received electronic mail (step S33).

That is, in general, the electronic mail is constituted of a header portion and body (mail content), the header portion has the information for exactly sending the electronic mail, but here the following is extracted from the information of the header portion.

From: (user's address) . . . (a)
    Subject: (s-memo code) . . . (b)

Subsequently, the control section 20 of the server 1 reads the text (this is assumed as (c)) corresponding to an s-memo code (b) from the s-memo table 23 (see FIG. 7) (step S34). Subsequently, the control section 20 of the server 1 refers to the user table 24 (see FIG. 12) (step S35), and judges whether or not an address (a) exists in the addresses 1 to 3 (step S36).

Here, when the address (a) exists in the addresses 1 to 3, a record is added to the demand log table of FIG. 14 (step S37).

That is, for example, when the address of a transmitter of the electronic mail is (a)="d1@xxx.ne.jp" and the title is (b)=10128, these exist in the user table 24 (FIG. 12), and therefore the user ID "ddddd", demander address "d1@xxx.ne.jp", and s-memo code "10128" are added to the demand log table 25.

It is to be noted that the record in the fourth row from above in FIG. 14 corresponds to this.

Moreover, the control section 20 of the server 1 reads the user's address (this is assumed as (d)) from the user table 24 (step S38), and returns texts (c) to demander's return desired address (d) (step S39).

In this example, when the texts (c) to be returned to the user ddddd is only a text file, the texts are returned to the addresses 1, 2. An HTML file or an attached file if any is returned to the address 2.

On the other hand, in the step S36, when the above-described (a) does not exist in the addresses 1 to 3, the record is added to the demand log table of FIG. 14. In this case, the demander's address (a) is stored as a user ID "none" together with the s-memo code (b) (step S40).

The record in a third row from above in FIG. 14 corresponds to this. Moreover, the texts (c) are returned to the demander's address (a) (step S41).

It is to be noted that when binary information of the data such as the image, sound, and program is attached to the texts (c), an extension function of the electronic mail referred to as multipurpose internet mail extensions (MIME) is used.

In this manner, after the process of the step S39, an electronic mail indicating that the electronic mail including the attached file has been sent to a returnable address, that is, in which "return situation report" is described is transmitted to at least one of the user's addresses (a), (d) (step S42).

As described above, one example of the process related to the information providing support service by the server 1 which has received the electronic mail related to the information demand by the user ends.

Next, a flow of a process for limiting users having specific tastes from the record of a demand action will be described in detail with reference to FIGS. 7, 12, 15.

Here, "education" will be illustrated as an example of the "specific tastes", and a process to limit the specific user will be described. First, the control section 20 of the server 1 acquires the s-memo code whose category is "education" from the s-memo table 23 (FIG. 7) (step S50). That is, in this example, the control section 20 refers to the s-memo table 23 of FIG. 7, detects the code whose "category" is "education", and obtains "10128" as the corresponding s-memo code.

Subsequently, the control section 20 of the server 1 refers to the demand log table 25 (FIG. 14) to specify the user who has demanded the s-memo code "10128" (step S51). In this example, objects are limited to users ddddd, eeeee.

Next, the control section 20 refers to the user table 24 (FIG. 12) to judge whether or not the corresponding users ddddd, eeeee accepts the DM from the company (step S52). That is, in this example, ddddd can also specify the address of a destination with "YES", and eeeee indicates "YES", but the address cannot be specified.

As described above, the control section 20 specifies ddddd as the corresponding user from the user table 24 to acquire the address 2 (step S53). In this manner, the process for limiting the user having the specific taste from the record of the demand action ends.

Since the client can obtain the address of the specific user limited by the server 1, various types of direct mail can be transmitted. It is to be noted that the transmission of the direct mail itself can be entrusted to the server 1.

The embodiment of the present invention has been described above, but the present invention is not limited to this, and can variously be modified/changed without departing from the scope.

For example, in the above-described embodiment, the character string has been described as the example of the s-memo code, and the information on an electronic mail return destination address can also be included in the s-memo code. That is, with "10128:2", the electronic mail is returned to the address 2. With "10128:1, 2", the electronic mail can be controlled to be returned to the addresses 1, 2.

Furthermore, it is supposed that a lottery number, discount ticket, and the like are included in the text of the electronic mail, when the server 1 returns the electronic mail corresponding to the s-memo code demanded by the user.

In this case, for example, a user who has seen the advertisement concerning a restaurant transmits the electronic mail whose s-memo code is described in the title to the server 1. Then, when the server 1 returns the information on the advertisement via the electronic mail, the "discount ticket" in the restaurant is automatically added into the text.

Moreover, one s-memo code is associated with a plurality of texts and registered, and a function of automatically returning the electronic mail under predetermined rules such as "random", "date designation", and "designated time designation" with respect to the demand from the user can also be added. In this case, for example, the electronic mail in which the s-memo code concerning the advertisement of a certain movie theater is described in the "title" is sent. Then, the server 1 returns the electronic mail concerning a movie schedule of "date" on which the electronic mail is received.

Furthermore, as a function with respect to a member (registered) user, for example, a function of returning a plurality of latest impressions of those who have used the restaurant via the electronic mail can also be realized, when the s-memo code concerning the certain restaurant is sent to the server 1 via the electronic mail. In this case, the server 1 stores a plurality of electronic mails beforehand in association with the s-memo code of the restaurant.

Moreover, when two or more s-memo codes are attached to the column of the "title" of the electronic mail, it is also possible to obtain the information on a plurality of clients with one operation.

As described above in detail, according to the present invention, there can be provided an information providing support system and method, and a program and server for use in the system and method, in which the following conveniences are given to a user and client to support, simplify, and smooth information providing services between the user and client.

That is, in detail, when the user simply operates a user terminal apparatus, desired information on advertisements can quickly be obtained via an electronic mail in a format suitable for storing/editing/arranging the information. Furthermore, when reception conditions of the electronic mail can appropriately be set, for example, the information on the advertisements can be received in two or more desired addresses.

Moreover, when the client only carries out a simple operation with a client terminal apparatus, desired advertisement information and attached file can quickly be registered as an object capable of being supplied to the user at any time for 24 hours. Furthermore, mail addresses of users who have specific tastes can be collected, and a direct mail can automatically be transmitted to the users.

What is claimed is:

1. A server which can freely communicate with a client terminal apparatus and a user terminal apparatus via a network, comprising:
   a communication section which communicates with the client terminal apparatus and user terminal apparatus;
   a control section which executes control so as to attach a predetermined code including a character string to predetermined information in a stage in which the predetermined information is accepted, when the communication section receives the predetermined information transmitted from the client terminal apparatus; and
   a storage section which associates and stores at least the predetermined code with the predetermined information and further a user ID with an address and a reception condition concerning the address,
   wherein the reception condition includes setting information on a file format for each of the plurality of addresses, disapproval/approval of an attached file, a maximum value of the number of characters, a maximum value of an attached file size, and acceptance/rejection of a direct mail, the control section executes the control so as to extract the predetermined code included in an electronic mail as information corresponding to a title of the electronic mail, read the predetermined information corresponding to the predetermined code from the storage section, and return the predetermined information to the address from the communication section via the electronic mail, when the communication section receives the electronic mail transmitted from the user terminal apparatus.

2. A server which can freely communicate with a client terminal apparatus and a user terminal apparatus via a network, comprising:
   a communication section which communicates with the client terminal apparatus and user terminal apparatus;
   a control section which executes control so as to attach a predetermined code including a character string to predetermined information in a stage in which the predetermined information is accepted, when the communication section receives the predetermined information transmitted from the client terminal apparatus; and
   a storage section which associates and stores at least the predetermined code with the predetermined information and further a user ID with a plurality of addresses and reception conditions concerning the respective addresses,
   wherein the reception conditions include setting information on a file format for each of the plurality of addresses, disapproval/approval of an attached file, a maximum value of the number of characters, a maximum value of an attached file size, and acceptance/rejection of a direct mail, and
   the control section executes the control so as to extract the predetermined code included in an electronic mail as information corresponding to a title of the electronic mail, read the predetermined information corresponding to the predetermined code from the storage section, and return the predetermined information to the address from the communication section via the electronic mail, when the communication section receives the electronic mail transmitted from the user terminal apparatus.

3. A server which can freely communicate with a client terminal apparatus and a user terminal apparatus via a network, comprising:
   a communication section which communicates with the client terminal apparatus and user terminal apparatus;
   a control section which executes control so as to attach a predetermined code including a character string to predetermined information in a stage in which the predetermined information is accepted, when the communication section receives the predetermined information transmitted from the client terminal apparatus; and
   a storage section which associates and stores at least the predetermined code with the predetermined information, further the predetermined code with the predetermined information and a category of the predetermined information, and further a user ID with a demander address, the predetermined code, and a reception condition of the demander address,
   wherein the reception condition includes setting information on a file format for the demander address, disapproval/approval of an attached file, a maximum value of the number of characters, a maximum value of an attached file size, and acceptance/rejection of a direct mail, the control section executes the control so as to extract the predetermined code included in an electronic mail as information corresponding to a title of the electronic mail, read the predetermined information corresponding to the predetermined code from the storage section, and return the predetermined information to the user terminal apparatus from the communication section via the electronic mail, when the communication section receives the electronic mail transmitted from the user terminal apparatus, and
   so as to acquire the predetermined code corresponding to the category from the storage section, further acquire the user ID and demander address corresponding to the predetermined code from the storage section, and transmit a direct mail to the demander address.

4. A server which can freely communicate with a client terminal apparatus and a user terminal apparatus via a network, comprising:
   a communication section which communicates with the client terminal apparatus and user terminal apparatus;
   a control section which executes control so as to attach a predetermined code including a character string to predetermined information in a stage in which the predetermined information is accepted, when the communication section receives the predetermined information transmitted from the client terminal apparatus; and
   a storage section which associates and stores the predetermined code with a plurality of pieces of the predetermined information, and which further associates a demander address with a reception condition of the demander address,
   wherein the reception condition includes setting information on a file format for the demander address, disapproval/approval of an attached file, a maximum value of the number of characters, a maximum value of an attached file size, and acceptance/rejection of a direct mail, the control section executes the control so as to extract the predetermined code included in an electronic mail as information corresponding to a title of the electronic mail, read the predetermined information corresponding to the predetermined code from the storage section under a predetermined rule concerning random designation, date designation, and time designation, and return the predetermined information to the user terminal apparatus from the communication section via the electronic mail, when the communication section receives the electronic mail transmitted from the demander address under the reception condition thereof.

5. An information providing support method by a server which can freely communicate with a client terminal apparatus and a user terminal apparatus via a network and which comprises a communication section, a control section, and a storage section, the method comprising:

executing control by the control section so as to attach a predetermined code including a character string to predetermined information in a stage in which the predetermined information is accepted, when the communication section receives the predetermined information transmitted from the client terminal apparatus;

associating and storing the predetermined code with the predetermined information and further a user ID with an address and reception conditions concerning the address by the storage section, wherein the reception conditions include setting information on a file format for each address, disapproval/approval of an attached file, a maximum value of the number of characters, a maximum value of an attached file size, and acceptance/rejection of a direct mail;

extracting the predetermined code included in an electronic mail as information corresponding to a title of the electronic mail by the control section, when the communication section receives the electronic mail transmitted from the user terminal apparatus; and executing the control by the control section so as to read the predetermined information corresponding to the predetermined code from the storage section, and return the predetermined information to the address via the electronic mail by the communication section.

6. An information providing support method according to claim 5, further comprising executing the control by the control section so as to transmit an HTML source of a predetermined code notice page including the predetermined code attached to the predetermined information to the client terminal apparatus via the communication section.

7. An information providing support method according to claim 5, further comprising executing the control by the control section so as to transmit an electronic mail including an HTML source of a predetermined code notice page including the predetermined code attached to the predetermined information and a content of the predetermined code notice page to the client terminal apparatus by the communication section.

8. An information providing support method according to claim 5, further comprising:

associating and storing the predetermined code with the predetermined information and a category of the predetermined information and further a user ID with a demander address and the predetermined code by the storage section; and further executing the control by the control section so as to acquire the predetermined code corresponding to the category from the storage section, further acquire the user ID and demander address corresponding to the predetermined code from the storage section, and transmit a direct mail to the demander address.

9. A program for use in a server which can freely communicate with a client terminal apparatus and a user terminal apparatus and which comprises a storage section, the program allowing the server to execute a process comprising:

a step of executing control so as to attach a predetermined code including a character string to predetermined information in a stage in which the predetermined information is accepted, when the predetermined information transmitted from the client terminal apparatus is received, associating and storing the predetermined code with a plurality of pieces of the predetermined information and associating and storing a demander address with a reception condition of the demander address in the storage section, wherein the reception condition includes setting information on a file format for the demander address, disapproval/approval of an attached file, a maximum value of the number of characters, a maximum value of an attached file size, and acceptance/rejection of a direct mail; and a step of executing the control so as to extract the predetermined code included in an electronic mail as information corresponding to a title of the electronic mail, read the predetermined information corresponding to the predetermined code from the storage section under a predetermined rule concerning random designation, date designation, and time designation, and return the predetermined information to the user terminal apparatus from the communication section via the electronic mail, when the electronic mail transmitted from the user terminal apparatus is received.

10. An information providing support method by a server which can freely communicate with a client terminal apparatus and a user terminal apparatus via a network and which comprises a communication section, a control section, and a storage section, the method comprising:

executing control by the control section so as to attach a predetermined code including a character string to predetermined information in a stage in which the predetermined information is accepted, when the communication section receives the predetermined information transmitted from the client terminal apparatus, associating and storing the predetermined code with a plurality of pieces of the predetermined information and associating and storing a demander address with a reception condition of the demander address by the storage section, wherein the reception condition includes setting information on a file format for the demander address, disapproval/approval of an attached file, a maximum value of the number of characters, a maximum value of an attached file size, and acceptance/rejection of a direct mail; and executing the control by the control section so as to extract the predetermined code included in an electronic mail as information corresponding to a title of the electronic mail, read the predetermined information corresponding to the predetermined code from the storage section under a predetermined rule concerning random designation, date designation, and time designation, and return the predetermined information to the demander address under the reception condition thereof from the communication section via the electronic mail, when the communication section receives the electronic mail transmitted from the user terminal apparatus.

11. A program for use in a server which can freely communicate with a client terminal apparatus and a user terminal apparatus and which comprises a storage section, the program allowing the server to execute a process comprising:

a step of attaching a predetermined code including a character string to predetermined information in a stage in which the predetermined information from the client terminal apparatus is accepted;

a step of associating and storing the predetermined code with the predetermined information and further with a user ID, an address, and reception conditions concerning the address by the storage section, wherein the reception conditions include setting information on a file format for each address, disapproval/approval of an attached file, a maximum value of the number of characters, a maximum value of an attached file size, and acceptance/rejection of a direct mail; and a step of extracting the predetermined code included in an electronic mail as information corresponding to a title of the electronic mail from the user terminal apparatus, reading the predetermined information corresponding to the predetermined code from the storage section, and returning the predetermined information to the address via the electronic mail.

12. A program according to claim 11, wherein the process further comprises a step of transmitting an HTML source of a predetermined code notice page including the predetermined code attached to the predetermined information to the client terminal apparatus.

13. A program according to claim 11, wherein the process further comprises a step of executing the control so as to transmit an electronic mail including an HTML source of a predetermined code notice page including the predetermined code attached to the predetermined information and a content of the predetermined code notice page to the client terminal apparatus.

* * * * *